(12) United States Patent
Funakoshi (10) Patent No.: US 10,230,892 B2
(45) Date of Patent: Mar. 12, 2019

(54) INFORMATION TERMINAL, METHOD FOR PROVIDING IMAGE-CAPTURING OPPORTUNITY, AND RECORDING MEDIUM STORING PROGRAM

(71) Applicant: OLYMPUS CORPORATION, Hachioji-shi, Tokyo (JP)

(72) Inventor: Naoto Funakoshi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/497,553

(22) Filed: Apr. 26, 2017

(65) Prior Publication Data

US 2017/0359509 A1 Dec. 14, 2017

(30) Foreign Application Priority Data

Jun. 8, 2016 (JP) .................................. 2016-114655

(51) Int. Cl.
| | |
|---|---|
| *H04N 5/232* | (2006.01) |
| *G06K 9/00* | (2006.01) |
| *G06K 9/62* | (2006.01) |
| *G01S 19/42* | (2010.01) |
| *G01S 19/13* | (2010.01) |

(52) U.S. Cl.
CPC ......... *H04N 5/23222* (2013.01); *G01S 19/42* (2013.01); *G06K 9/00671* (2013.01); *G06K 9/6202* (2013.01); *H04N 5/23293* (2013.01); *G01S 19/13* (2013.01)

(58) Field of Classification Search
CPC .................... H04N 5/23222; H04N 5/23293
See application file for complete search history.

(56) References Cited

U.S. PATENT DOCUMENTS

| | | | | |
|---|---|---|---|---|
| 2007/0239847 | A1* | 10/2007 | Takehara | G11B 27/034 709/217 |
| 2012/0002883 | A1* | 1/2012 | Gotoh | H04N 1/00132 382/217 |
| 2014/0057342 | A1* | 2/2014 | Uozumi | C12M 41/36 435/288.7 |

FOREIGN PATENT DOCUMENTS

JP 2014-216685 11/2014

* cited by examiner

*Primary Examiner* — Antoinette T Spinks
(74) *Attorney, Agent, or Firm* — John C. Pokotylo; Pokotylo Patent Services (57) ABSTRACT

An information terminal includes an image-capturing information acquisition unit that acquires image-capturing information added to a captured image selected from among one or more captured images; a position information acquisition unit that acquires position information; a communication unit that acquires, from the outside, environmental change information in the past and environmental change information in the future on the basis of the image-capturing information and the position information; a comparison unit that compares the environmental change information in the past with the environmental change information in the future; and a report unit that reports an image-capturing opportunity on the basis of a result of the comparison performed by the comparison unit.

8 Claims, 6 Drawing Sheets

| ITEM | CLASSIFICATION | | | |
|---|---|---|---|---|
| | SUNNY | CLOUDY | RAINY | SNOW |
| WEATHER | | | | |
| TEMPERATURE [° C] | UP TO 0 | 1-10 | 11-20 | 21-30 | 31 AND ABOVE |
| PRECIPITATION [mm] | UP TO 0 | 1-10 | 11-20 | 21-30 | 31 AND ABOVE |
| HUMIDITY (%) | UP TO 30 | 31-50 | 51-70 | 71 AND ABOVE |
| WIND SPEED (m/s) | 0 | 1-5 | 6-10 | 11 AND ABOVE |
| WIND DIRECTION | NORTH | EAST | SOUTH | WEST |

F I G. 4

INFORMATION TERMINAL, METHOD FOR PROVIDING IMAGE-CAPTURING OPPORTUNITY, AND RECORDING MEDIUM STORING PROGRAM

CROSS-REFERENCE TO RELATED APPLICATIONS

This application is based upon and claims the benefit of priority of the prior Japanese Patent Application No. 2016-114655, filed Jun. 8, 2016, the entire contents of which are incorporated herein by reference.

FIELD

The present invention relates to an information terminal, a method for providing an image-capturing opportunity, the method being performed by the information terminal, and a recording medium storing a program executed in the information terminal.

BACKGROUND

When a camera user performs image-capturing, the user may use, for example, an image (a picture) captured by the user in the past or an image captured by others as a reference. In this case, the user often refers to the weather when the image was captured.

However, a captured image has a different ambience not only according to the weather when the image is captured but also according to how the weather has changed up to the point at which the image is captured. For example, when there are two images both captured on a fine day, an image captured on a fine day after the weather stayed fine for several days and an image captured on a fine day after some time of rain have greatly different ambiences.

Thus, even if an image is captured in the same weather as the weather in which a reference image was captured, there is a possibility that an image with a similar ambience will not be captured.

As a device that performs image-capturing while taking into consideration the weather, an image pickup device is known that acquires weather information upon image-capturing, sets an image-capturing condition such that an image in which weather indicated by the weather information is reflected can be obtained, and performs image-capturing (see, for example, Japanese Laid-open Patent Publication No. 2014-216685). As described, in this image pickup device, image-capturing is performed while taking into consideration the weather upon image-capturing.

When the user performs image-capturing using an image captured in the past as a reference, he/she takes into consideration the weather when the image was captured, but does not take into consideration weather changes up to the point at which the image was captured. Thus, even if the user wanted to capture an image with an ambience similar to the ambience of the image used as a reference, he/she might miss such an image-capturing opportunity.

SUMMARY

An aspect of the present invention provides an information terminal including a display unit that displays one or more captured images; an image-capturing information acquisition unit that acquires image-capturing information added to a captured image selected from among the one or more captured images displayed on the display unit; a position information acquisition unit that acquires position information; a communication unit that acquires, from the outside, environmental change information in the past and environmental change information in the future on the basis of the image-capturing information and the position information; a comparison unit that compares the environmental change information in the past with the environmental change information in the future; and a report unit that reports an image-capturing opportunity on the basis of a result of the comparison performed by the comparison unit.

Another aspect of the present invention provides a method for providing an image-capturing opportunity, the method being performed by an information terminal, the method including displaying one or more captured images; acquiring image-capturing information added to a captured image selected from among the displayed one or more captured images; acquiring position information; acquiring, from the outside, environmental change information in the past and environmental change information in the future on the basis of the image-capturing information and the position information; comparing the environmental change information in the past with the environmental change information in the future; and reporting an image-capturing opportunity on the basis of a result of the comparison.

Yet another aspect of the present invention provides a non-transitory computer-readable recording medium storing a computer program for causing a computer included in an information terminal to perform a process including displaying one or more captured images; acquiring image-capturing information added to a captured image selected from among the displayed one or more captured images; acquiring position information; acquiring, from the outside, environmental change information in the past and environmental change information in the future on the basis of the image-capturing information and the position information; comparing the environmental change information in the past with the environmental change information in the future; and reporting an image-capturing opportunity on the basis of a result of the comparison.

DESCRIPTION OF EMBODIMENTS

Embodiments of the present invention will now be described with reference to the drawings.

Figure 1:
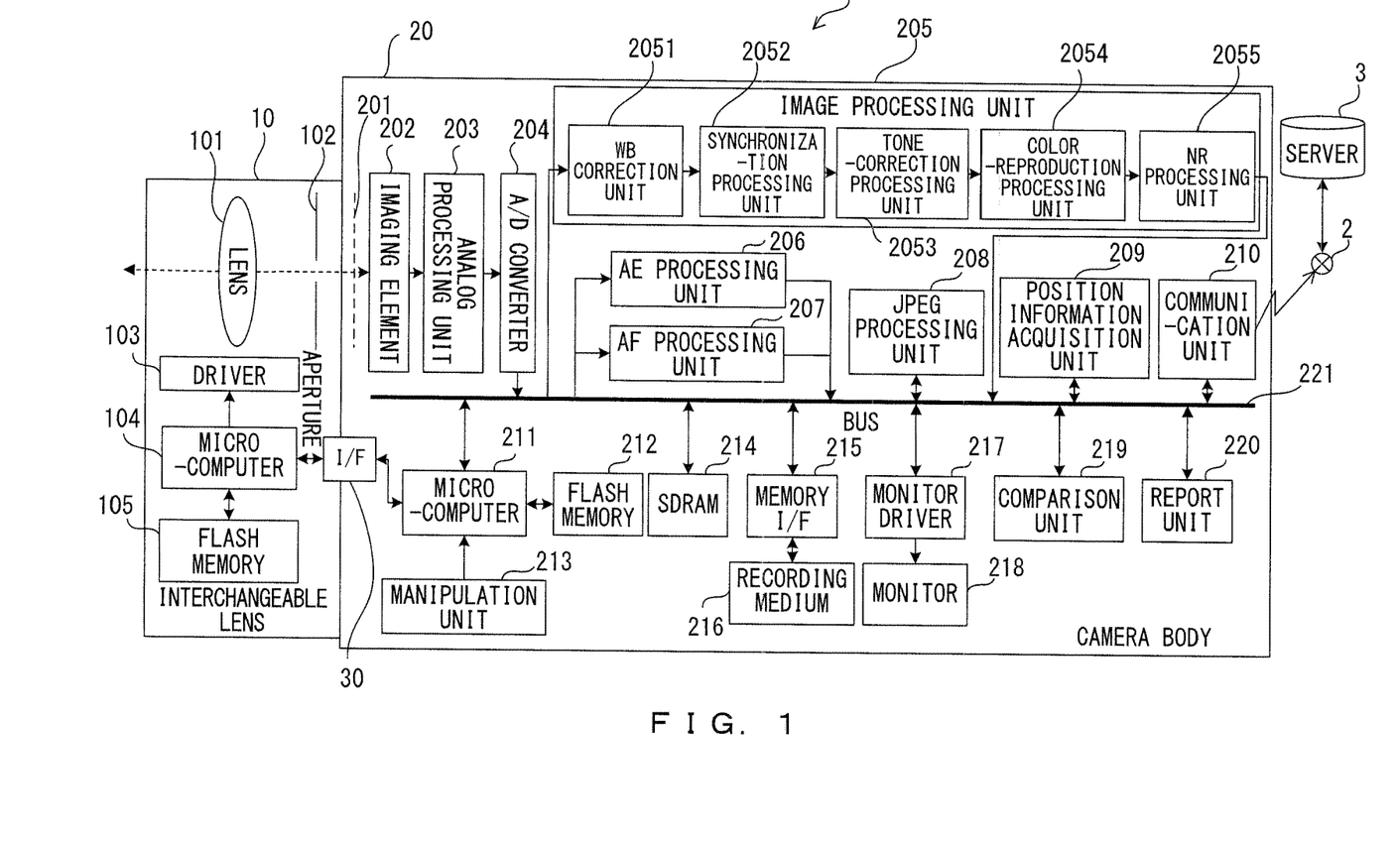
FIG. 1 illustrates an example of a configuration of a camera that is an information terminal according to an embodiment.

FIG. 1 illustrates an example of a configuration of a camera that is an information terminal according to an embodiment of the present invention. This camera is a lens-interchangeable camera, but it may be a lens-integrated camera.

As illustrated in FIG. 1, a camera 1 includes an interchangeable lens 10 and a camera body 20, and the interchangeable lens 10 is configured to be attachable to and removable from the camera body 20. When the interchangeable lens 10 is attached to the camera body 20, the interchangeable lens 10 and the camera body 20 can communicate with each other through I/Fs (interfaces) 30. The I/F 30 is, for example, an electrical contact point that is provided in each of the interchangeable lens 10 and the camera body 20, and when the interchangeable lens 10 is attached to the camera body 20, their electrical contact points will be connected.

The interchangeable lens 10 includes an image-capturing lens 101, an aperture 102, a driver 103, a microcomputer 104, and a flash memory 105.

The capturing lens 101 is an optical system that collects a light flux from a subject (not illustrated) in an imaging element 202 included in the camera body 20, and includes a focusing lens. The capturing lens 101 may include a zoom lens.

The aperture 102 is configured to be openable and closable so as to adjust an amount of the light flux incident through the capturing lens 101.

The driver 103 includes, for example, a motor, and is a drive mechanism that drives (moves) the focusing lens included in the capturing lens 101 in an optical direction of the focusing lens and drives the aperture 102 to be opened or closed, under the control of the microcomputer 104.

The microcomputer 104 controls an operation of the interchangeable lens 10 by executing a program stored in the flash memory 105. For example, under the control of a microcomputer 211 included in the camera body 20, the microcomputer 104 performs, for example, a control of driving the focusing lens included in the capturing lens 101 and a control of driving the aperture 102 to be opened and closed.

The flash memory 105 stores, for example, a program executed by the microcomputer 104 and data used while executing the program.

The camera body 20 includes a mechanical shutter 201, the imaging element 202, an analog processing unit 203, an A/D (analog/digital) converter 204, an image processing unit 205, an AE (auto exposure) processing unit 206, an AF (auto focus) processing unit 207, a JPEG processing unit 208, a position information acquisition unit 209, a communication unit 210, the microcomputer 211, a flash memory 212, a manipulation unit 213, an SDRAM (synchronous dynamic random access memory) 214, a memory I/F 215, a recording medium 216, a monitor driver 217, a monitor 218, a comparison unit 219, a report unit 220, and a bus 221.

The mechanical shutter 201 is configured to be movable so that the photoelectric conversion surface of the imaging element 202 is in a light-blocking state or in an exposure state.

The exposure time of the imaging element 202 is adjusted by moving the mechanical shutter 201. The mechanical shutter 201 is, for example, a focal-plane shutter.

The imaging element 202 includes a photoelectric conversion surface on which an image of a light flux from the subject is formed, the light flux being collected through the capturing lens 101. The photoelectric conversion surface is configured by arranging a plurality of pixels in two dimensions. Further, for example, a color filter in a Bayer arrangement is provided on the light-incident side of the photoelectric conversion surface. The imaging element 202 having this configuration converts an image (subject image) that corresponds to the light flux whose image is formed on the photoelectric conversion surface into an electrical signal (hereinafter referred to as an image signal) corresponding to the amount of the light flux, and outputs the image signal. The imaging element 202 is an image sensor such as a CCD (charge coupled device) image sensor or a CMOS (complementary metal oxide semiconductor) image sensor.

The analog processing unit 203 performs analog processing, such as CDS (correlated double sampling) processing and AGC (automatic gain control) processing, on the image signal output from the imaging element 202.

The A/D converter 204 converts, into a digital signal (hereinafter referred to as image data), the image signal on which analog processing has been performed in the analog processing unit 203.

The image processing unit 205 includes a WB (white balance) correction unit 2051, a synchronization processing unit 2052, a tone-correction processing unit 2053, a color-reproduction processing unit 2054, and an NR (noise reduction) processing unit 2055, and performs a variety of image processing on image data.

The WB correction unit 2051 performs processing of correcting a white balance on image data. The synchronization processing unit 2052 performs synchronization processing of obtaining, for example, image data constituted of information on R, G, and B for each pixel from image data with a Bayer arrangement. The tone-correction processing unit 2053 performs processing of correcting an image tone. The color-reproduction processing unit 2054 performs color-reproduction processing of changing an image shade. The NR processing unit 2055 performs processing of reducing noise by, for example, performing processing by use of a filter that reduces a high frequency or performing coring processing.

The AE processing unit 206 calculates a subject brightness using image data. The subject brightness is not limited to being calculated from image data, but it may be measured using, for example, a dedicated photometric sensor.

The AF processing unit 207 picks up a signal of high-frequency components from image data, and integrates picked-up signals of high-frequency components so as to obtain a focusing evaluation value for AF.

The JPEG processing unit 208 performs JPEG compression processing on image data and JPEG decompression processing on JPEG-compressed image data.

The position information acquisition unit 209 acquires position information on, for example, a current position of the camera 1 or a position specified by the user through the manipulation unit 213. The position information on a current position of the camera 1 is acquired by use of, for example, a GPS (global positioning system) or position information on a base station used when the communication unit 210 communicates with the outside. Further, the position information on a position specified by the user is acquired, for example, from a position-information providing server (not illustrated) through the communication unit 210 and a network 2. The network 2 is, for example, the Internet.

The communication unit 210 communicates with the outside such as a weather-information providing server 3 or the position-information providing server through the network 2.

The weather-information providing server 3 is a server that provides weather information such as weather, temperature, precipitation, humidity, wind speed, and wind direction in the past, at present, and in the future. For example, the communication unit 210 communicates with the weather-information providing server 3 and acquires weather change information in the past, at present, and in the future.

The weather change information is time-series weather information that indicates a weather change and is an example of environmental change information.

The microcomputer 211 controls an operation of the camera 1 (the interchangeable lens 10 and the camera body 20) by executing a program stored in the flash memory 212. For example, the microcomputer 211 controls an image-capturing-opportunity providing operation described later using FIGS. 2A to 2C.

The flash memory 212 stores, for example, a program executed by the microcomputer 211 and data used while executing the program.

The manipulation unit 213 is a manipulation member manipulated when the user performs various inputs into the camera 1. A portion of or the entirety of the manipulation unit 213 may be configured to be a virtual manipulation unit performed with a touch panel.

The SDRAM 214 is a memory used as, for example, a working area, and, for example, data (such as image data) that is being processed is temporarily stored in the SDRAM 214.

The memory I/F 215 is an interface used when, for example, the microcomputer 211 accesses the recording medium 216.

The recording medium 216 is a memory card attachable to and removable from the camera body 20. The recording medium 216 records, for example, an image file. The image file is, for example, a file in which header information is added to image data JPEG-compressed by the JPEG processing unit 208. The recording medium 216 may be built-in within the camera body 20 (that is, the recording medium 216 does not have to be attachable and removable).

The monitor driver 217 is, for example, a driver IC (integrated circuit) for display, and converts, for example, image data into a video signal so as to output the video signal to the monitor 218.

The monitor 218 is, for example, a liquid crystal display (LCD) panel, and displays a video corresponding to the video signal input from the monitor driver 217. For example, the monitor 218 displays one or more captured images (images captured in the past).

The comparison unit 219 performs a comparison in weather change information, as described later using FIGS. 2A to 2C.

The report unit 220 reports an image-capturing opportunity to the user on the basis of a result of the comparison performed by the comparison unit 219, as described later using FIGS. 2A to 2C. The report from the report unit 220 is performed, for example, by the report being displayed on the monitor 218.

The bus 221 is a transfer line that transfers a variety of data in the camera body 20.

In the camera 1 having the configuration described above, the monitor 218 is an example of a display unit that displays one or more captured images. Some of the functions in the microcomputer 211 are examples of an image-capturing information acquisition unit that acquires image-capturing information added to a captured image selected from among the one or more captured images displayed on the display unit. The position information acquisition unit 209 is an example of a position information acquisition unit that acquires position information. The communication unit 210 is an example of a communication unit that acquires, from the outside, environmental change information in the past and environmental change information in the future on the basis of the image-capturing information and the position information. The comparison unit 219 is an example of a comparison unit that compares the environmental change information in the past and the environmental change information in the future. The report unit 220 is an example of a report unit that reports an image-capturing opportunity on the basis of a result of the comparison performed by the comparison unit.

Further, in the camera body 20, the analog processing unit 203, the A/D converter 204, the image processing unit 205, the AE processing unit 206, the AF processing unit 207, the JPEG processing unit 208, the position information acquisition unit 209, the comparison unit 219, and the report unit 220 are configured by, for example, an electronic circuit such as an ASIC (application specific integrated circuit) or an FPGA (field programmable gate array). The communication unit 210 is, for example, a communication interface device.

Next, an image-capturing-opportunity providing operation performed by the camera 1 is described.

In this image-capturing-opportunity providing operation, for example, when the user selects a desired captured image, an opportunity to capture an image with a similar ambience to the desired captured image is reported to the user.

Figure 2A:
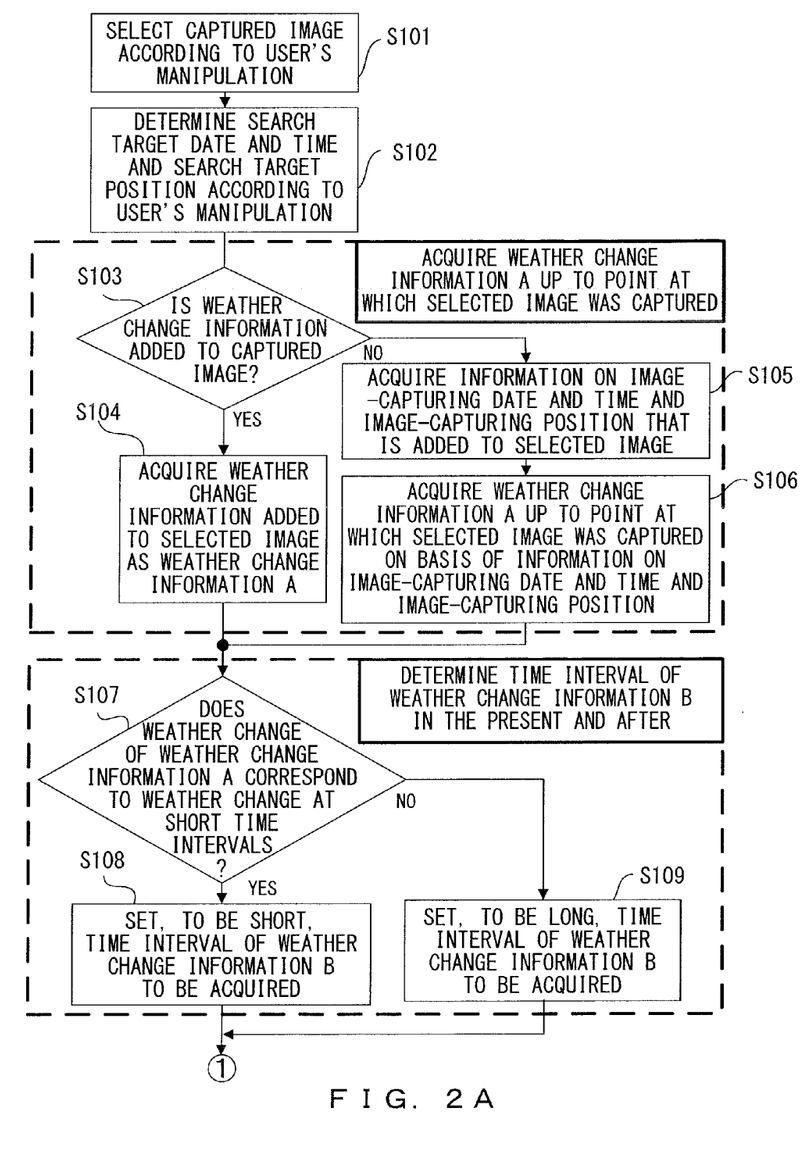
FIG. 2A is part 1 of a flowchart that illustrates an example of an image-capturing-opportunity providing operation performed by the camera according to the embodiment.
Figure 2B:
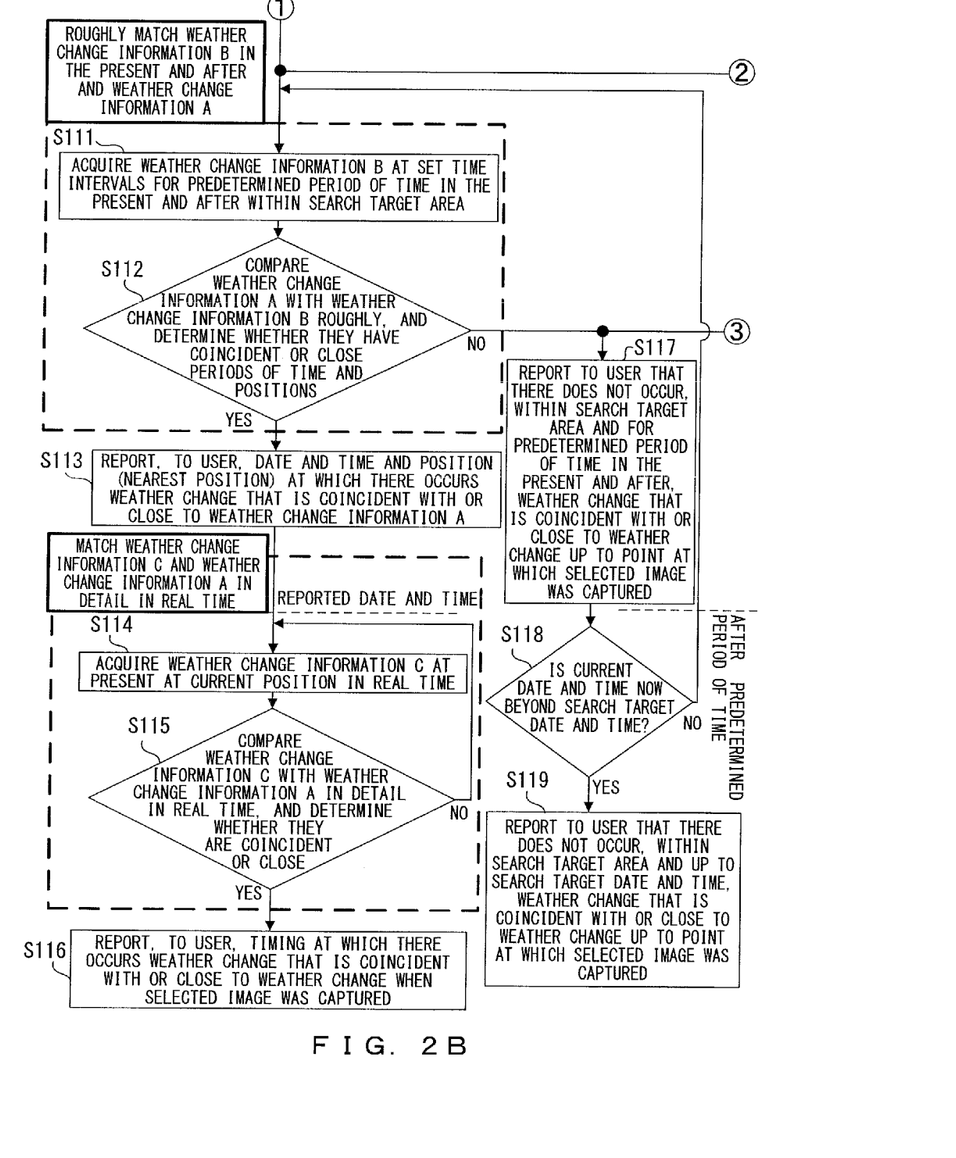
FIG. 2B is part 2 of the flowchart that illustrates the example of the image-capturing-opportunity providing operation performed by the camera according to the embodiment.
Figure 2C:
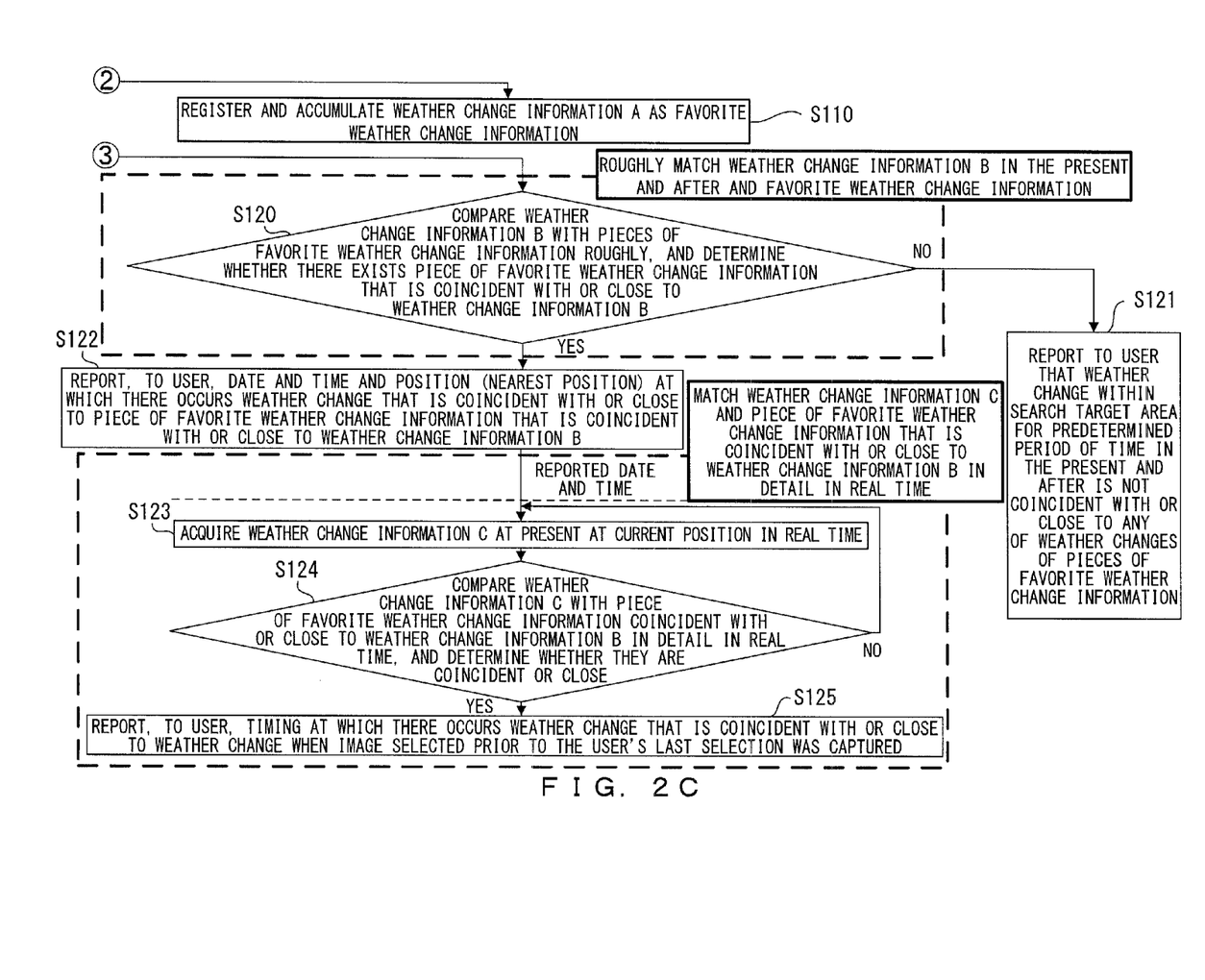
FIG. 2C is part 3 of the flowchart that illustrates the example of the image-capturing-opportunity providing operation performed by the camera according to the embodiment.

FIGS. 2A to 2C are a flowchart that illustrates an example of the image-capturing-opportunity providing operation.

As illustrated in FIG. 2A, in this operation, first, the microcomputer 211 selects a captured image from among one or more captured images according to a manipulation of the manipulation unit 213 performed by the user (S101). The user's manipulation in this case is a manipulation to select, from among one or more captured images displayed on the monitor 218, a captured image with an ambience that the user desires to capture. Here, each of the one or more captured images displayed on the monitor 218 is, for example, a captured image indicated by captured image data of a captured image file recorded in the recording medium 216, or a captured image indicated by captured image data obtained from the outside through the communication unit 210 and the network 2.

Next, the microcomputer 211 determines a search target date and time and a search target position according to a manipulation of the manipulation unit 213 performed by the user (S102). The user's manipulation in this case is a manipulation to specify the search target date and time and the search target position. For example, when the user performs a manipulation to specify the search target position, the position information acquisition unit 209 acquires, according to the manipulation, corresponding position information from a position-information providing server through the communication unit 210 and the network 2, and a position indicated by the position information is determined to be the search target position.

Next, the microcomputer 211 performs processing of acquiring weather change information A up to the point at which the captured image selected in S101 was captured (from a point in time before the selected image was captured up to the point at which the selected image was captured) (S103 to S106).

Specifically, first, the microcomputer 211 determines whether weather change information has been added to the captured image selected in S101 (S103). This determination is performed by, for example, determining whether the weather change information is included in header information added to captured image data that indicates the captured image selected in S101.

When a result of the determination in S103 is Yes, the microcomputer 211 acquires weather change information added to the captured image selected in S101 as weather change information A (S104).

On the other hand, when the result of the determination in S103 is No, the microcomputer 211 acquires information on an image-capturing date and time and an image-capturing position that is added to the captured image selected in S101 (S105). This acquisition is performed by, for example, acquiring information on an image-capturing date and time and an image-capturing position that is included in the header information added to the captured image data that indicates the captured image selected in S101.

Next, the microcomputer 211 acquires the weather change information A up to the point at which the captured image selected in S101 was captured from the weather-information providing server 3 through the communication unit 210 and the network 2, on the basis of the information on an image-capturing date and time and an image-capturing position that has been acquired in S105 (S106).

After S104 or S106, the microcomputer 211 performs processing of determining a time interval of time-series weather information to be acquired as weather change information B in the present and after (in the future) (S107 to S109).

Specifically, first, the microcomputer 211 determines whether a weather change indicated by the weather change information A acquired in S104 or S106 is a weather change that changes at short time intervals (S107).

When a result of the determination in S107 is Yes, the microcomputer 211 sets, to be short, a time interval of time-series weather information to be acquired as weather change information B (S108).

On the other hand, when the result of the determination in S107 is No, the microcomputer 211 sets, to be long, the time interval of the time-series weather information to be acquired as the weather change information B (S109).

After S108 or S109, the process is split into S110 illustrated in FIG. 2C and S111 illustrated in FIG. 2B.

As illustrated in FIG. 2C, in S110, the microcomputer 211 registers and accumulates the weather change information A acquired in S104 or S106 as favorite weather change information. The registration and accumulation are performed by, for example, recording the weather change information A in the recording medium 216.

As illustrated in FIG. 2B, in S111 and S112, the microcomputer 211 roughly matches the weather change information B in the present and after and the weather change information A acquired in S104 or S106.

Specifically, first, the microcomputer 211 acquires the weather change information B from the weather-information providing server 3 through the communication unit 210 and the network 2, wherein the weather change information B is time-series weather information at time intervals set in S108 or S109 for a predetermined period of time in the present and after within a radius of a predetermined distance from the search target position determined in S102 (hereinafter referred to as "within a search target area") (S111). Here, the predetermined distance is assumed to be, for example, several tens of kilometers, taking into consideration the ease of the user's movement. Further, the predetermined period of time is assumed to be, for example, three days, taking into consideration, for example, the accuracy of weather information (that is, a weather forecast) in the present and after that will be provided by the weather-information providing server 3. It is also possible to change the predetermined distance and the predetermined period of time according to the manipulation of the manipulation unit 213 performed by the user.

Next, under the control of the microcomputer 211, the comparison unit 219 roughly compares the weather change information A acquired in S104 or S106 with the weather change information B acquired in S111 (at long time intervals) in a chronological order, and determines whether they have coincident or close periods of time and positions (S112).

When a result of the determination in S112 is Yes, the report unit 220 reports, to the user and under the control of the microcomputer 211, a date and time and a position at which there occurs a weather change that is coincident with or close to the weather change indicated by the weather change information A (S113). This results in reporting, to the user, an opportunity to capture an image with an ambience similar to the ambience of the captured image selected in S101. The position reported to the user at this point is, for example, a nearest position from the current position of the user (camera 1). The current position of the camera 1 is acquired by the position information acquisition unit 209.

After S113, when the date and time reported to the user in S113 has arrived, the microcomputer 211 matches weather change information C at present and the weather change information A acquired in S104 or S106 in detail in real time (S114 and S115).

Specifically, first, the microcomputer 211 acquires the weather change information C at present at the current position of the camera 1 from the weather-information providing server 3 through the communication unit 210 and the network 2 in real time (S114). It is assumed that, at this point, the user (camera 1) has moved to the position reported in the S113 and is now situated at the reported position.

Next, under the control of the microcomputer 211, the comparison unit 219 compares the weather change information C acquired in S114 with the weather change information A acquired in S104 or S106 in detail (at short time intervals) in a chronological order in real time, and determines whether they are coincident or close (S115).

When a result of the determination in S115 is Yes, the report unit 220 reports, to the user and under the control of the microcomputer 211, a timing at which there occurs a weather change that is coincident with or close to the weather change when the captured image selected in S101 was captured (S116). This results in reporting, to the user, an opportunity to capture an image with an ambience similar to the ambience of the captured image selected in S101.

On the other hand, when the result of the determination in S115 is No, the process returns to S114.

When the result of the determination in S112 is No, the process is split into S117 and S120 illustrated in FIG. 2C.

In S117, under the control of the microcomputer 211, the report unit 220 reports to the user that there does not occur, within a search target area and for a predetermined period of time in the present and after, a weather change that is coincident with or close to the weather change up to the point at which the captured image selected in S101 was captured (the weather change indicated by the weather change information A).

After S117, the microcomputer 211 determines whether the current date and time is now beyond the search target date and time determined in S102 (S118).

When a result of the determination in S118 is Yes, the report unit 220 reports, to the user and under the control of the microcomputer 211, that there does not occur, within the search target area and up to the search target date and time, a weather change that is coincident with or close to the weather change up to the point at which the captured image selected in S101 was captured (the weather change indicated by the weather change information A) (S119).

On the other hand, when the result of the determination in S118 is No, the process returns to S111 after the predetermined period of time in the present and after has elapsed.

As illustrated in FIG. 2C, in S120, the microcomputer 211 roughly matches the weather change information B in the present and after and the favorite weather change information. Specifically, under the control of the microcomputer 211, the comparison unit 219 roughly compares the weather change information B acquired in S111 with registered and accumulated pieces of favorite weather change information (at long time intervals) in a chronological order, and determines whether there exists a piece of favorite weather change information that is coincident with or close to the weather change information B.

When a result of the determination in S120 is No, under the control of the microcomputer 211, the report unit 220 reports to the user that the weather change within the search target area for a predetermined period of time in the present and after (the weather change indicated by the weather change information B) is not coincident with or close to any of the weather changes indicated by the registered and accumulated pieces of favorite weather change information (S121).

On the other hand, when the result of the determination in S120 is Yes, the report unit 220 reports, to the user and under the control of the microcomputer 211, a date and time and a position at which there occurs a weather change that is coincident with or close to the weather change indicated by the piece of favorite weather change information that is coincident with or close to the weather change information B (S122). This results in reporting, to the user, an opportunity to capture an image with an ambience similar to the ambience of the captured image selected in S101 performed prior to the last time S101 was performed. The position reported to the user at this point is, for example, a nearest position from the current position of the user (camera 1). The current position of the camera 1 is acquired by the position information acquisition unit 209.

After S122, when the date and time reported to the user in S122 has arrived, the microcomputer 211 matches the weather change information C at present and the piece of favorite weather change information that is coincident with or close to the weather change information B in detail in real time (S123 and S124).

Specifically, first, the microcomputer 211 acquires the weather change information C at present at the current position of the camera 1 from the weather-information providing server 3 through the communication unit 210 and the network 2 in real time (S123). It is assumed that, at this point, the user (camera 1) has moved to the position reported in S122 and is now situated at the reported position.

Next, under the control of the microcomputer 211, the comparison unit 219 compares the weather change information C acquired in S123 with the piece of favorite weather change information that is coincident with or close to the weather change information B in detail (at short time intervals) in a chronological order in real time, and determines whether they are coincident or close (S124).

When a result of the determination in S124 is Yes, the report unit 220 reports, to the user and under the control of the microcomputer 211, a timing at which there occurs a weather change that is coincident with or close to the weather change when the captured image selected in S101 performed prior to the last time S101 was performed was captured (the weather change indicated by the piece of favorite weather change information coincident with or close to the weather change information B) (S125). This results in reporting, to the user, an opportunity to capture an image with an ambience similar to the ambience of the captured image selected in S101 performed prior to the last time S101 was performed.

On the other hand, when the result of the determination in S124 is No, the process returns to S123.

Figure 3:
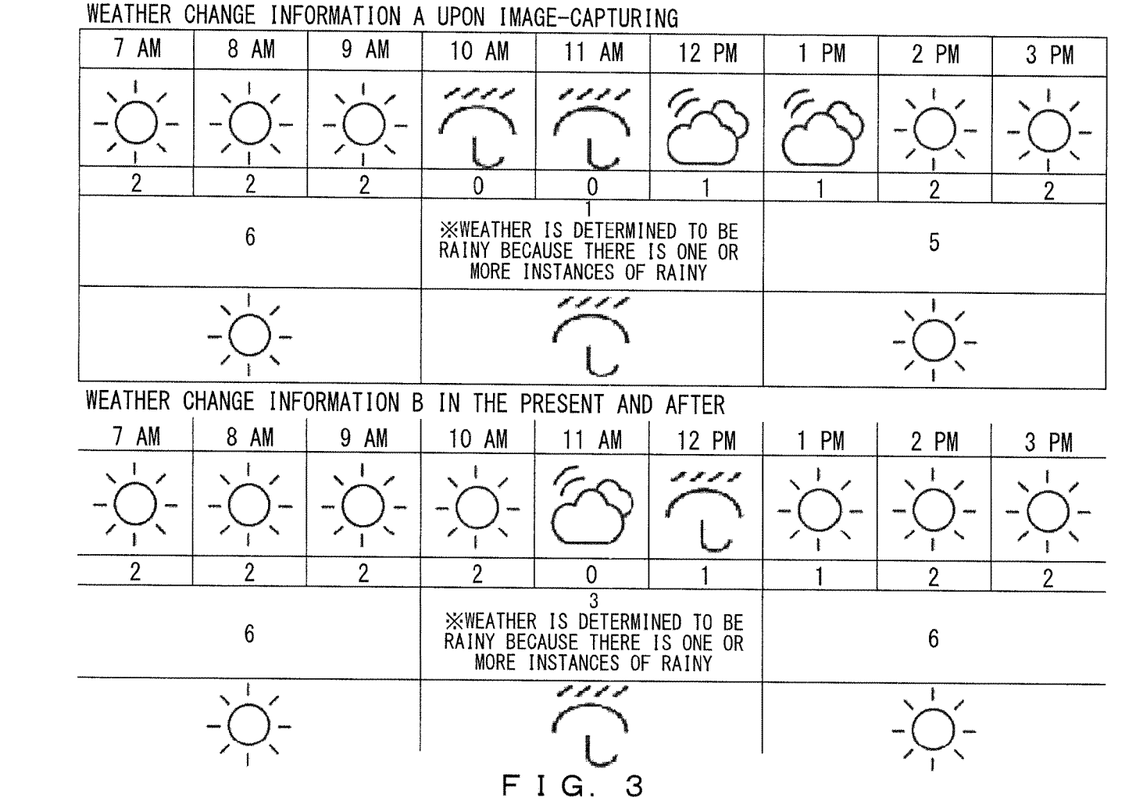
FIG. 3 is a diagram that illustrates an example of a comparison performed in the determination in S112.

FIG. 3 is a diagram that illustrates an example of the comparison performed in the determination in S112 described above.

In FIG. 3, the weather change information A upon image-capturing includes weather information for each hour from 7 AM to 3 PM. Specifically, it includes weather information indicating that the weather at 7 AM, 8 AM, and 9 AM are "sunny", the weather at 10 AM and 11 AM are "rainy", the weather at 12 PM and 1 PM are "cloudy", and the weather at 2 PM and 3 PM are "sunny".

The weather change information B in the present and after includes weather information for each hour from 7 AM to 3 PM. Specifically, it includes weather information indicating that the weather at 7 AM, 8 AM, 9 AM, and 10 AM is "sunny", the weather at 11 AM is "cloudy", the weather at 12 PM is "rainy", and the weather at 1 PM, 2 PM, and 3 PM is "sunny".

In this case, the weather change information A and the weather change information B are compared by, for example, the following procedure.

First, in each of the pieces of weather change information, the weather for each hour is replaced with a numerical value, such as "sunny" with 2, "cloudy" with 1, and "rainy" with 0.

Next, in each of the pieces of weather change information, the numerical values are added for each set of three hours.

Next, in each of the pieces of weather change information, the weather for each set of three hours is generalized according to the follow conditions.

The weather is determined to be "rainy" when the weather for each set of three hours includes one or more instances of "rainy", the weather is determined to be "sunny" when the sum of the numerical values is not less than five, and the weather is determined to be "cloudy" in the other cases.

Then, the two pieces of weather change information each obtained by the generalization are compared.

According to the procedure described above, in the weather change information A, the weather at 7 AM, 8 AM, and 9 AM is respectively quantified to be "2", "2", and "2", and the sum is not less than five, so the weather for the three hours is determined to be "sunny". Further, the weather at 10 AM, 11 AM, and 12 PM includes rain, so the weather for the three hours is determined to be "rainy". Furthermore, the weather at 1 PM, 2 PM, and 3 PM is respectively quantified to be "1", "2", and "2", and the sum is not less than five, so the weather for the three hours is determined to be "sunny".

In the weather change information B, the weather at 7 AM, 8 AM, and 9 AM are respectively quantified to be "2", "2", and "2", and the sum is not less than five, so the weather for the three hours is determined to be "sunny". Further, the weather at 10 AM, 11 AM, and 12 PM includes rain, so the weather for the three hours is determined to be "rainy". Furthermore, the weather at 1 PM, 2 PM, and 3 PM is respectively quantified to be "2", "2", and "2", and the sum is not less than five, so the weather for the three hours is determined to be "sunny".

Thus, weather changes indicated by the two pieces of weather change information obtained by the generalization are both "sunny", "rainy", "sunny", so they are coincident.

The comparison procedure described above can also be used when the weather change information B and the favorite weather change information are compared in the determination in S120 described above.

In the example illustrated in FIG. 3, "sunny", "rainy", and "cloudy" have been indicated as weather to be quantified, but "snow" may further be added. In this case, "snow" is also replaced with a predetermined numerical value to be compared.

Further, in the example illustrated in FIG. 3, the example in which weather is quantified so that a comparison is performed has been described, but, instead of the weather, temperature, precipitation, humidity, wind speed, or wind direction may be quantified so that a comparison is performed. In this case, they may be quantified so that a comparison is performed according to, for example, the classification illustrated in FIG. 4.

Figure 4:
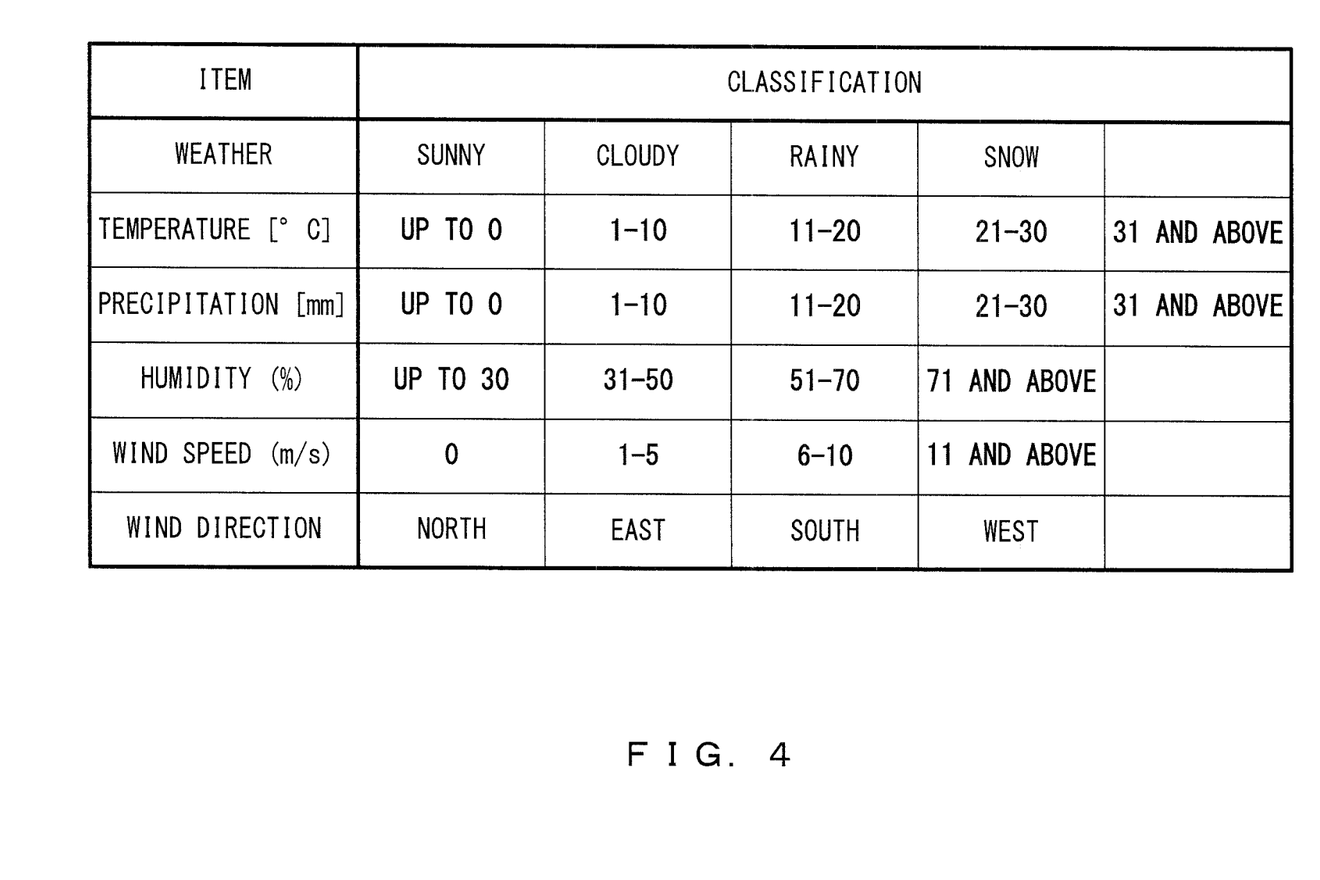
FIG. 4 is a diagram that illustrates an example of items to be quantified and their classification.

FIG. 4 is a diagram that illustrates an example of items to be quantified and their classification.

In FIG. 4, for example, "TEMPERATURE [° C.]" is classified into five segments, "up to 0", "1-10", "11-20", "21-30", and "31 and above", and a temperature is replaced with a corresponding numerical value according to a corresponding segment. For example, when the temperature is 15° C., 15° C. corresponds to the segment "11-20" and is quantified to be a numerical value corresponding to the segment.

Further, for example, "HUMIDITY (%)" is classified into four segments, "up to 30", "31-50", "51-70", and "71 and above", and a humidity is replaced with a corresponding numerical value according to a corresponding segment. For example, when the humidity is 60%, 60% corresponds to the segment "51-70" and is quantified to be a numerical value corresponding to the segment.

Alternatively, two or more items among from weather, temperature, precipitation, humidity, wind speed, and wind direction may be used as an item to be quantified so that a comparison is performed.

As described above, according to the present embodiment, when a user selects a desired captured image and specifies a search target position, it is possible to report, to the user, a date and time and a position at which there occurs, around the search target position (within a search target area), a weather change that is coincident with or close to a weather change from a point in time before the captured image selected by the user was captured up to the point at which the selected image was captured. Then, when the reported date and time has arrived, it is possible to report, to the user, a timing at which there occurs a weather change that is coincident with or close to the weather change when the captured image was captured. Thus, the user can capture an image with an ambience similar to the ambience of the desired captured image, by performing image-capturing at the reported timing at the reported position. Accordingly, the present embodiment makes it possible to provide, to the user, an opportunity to capture an image with an ambience similar to the ambience of the image captured in the past which is desired by the user.

Further, according to the present embodiment, when there does not occur, around the search target position (within the search target area), the weather change that is coincident with or close to the weather change from a point in time before the captured image selected by the user was captured up to the point at which the selected image was captured, it is also possible to report, to the user, a date and time and a position at which there occurs a weather change that is coincident with or close to a weather change from a point in time before a desired captured image selected by the user prior to the user's last selection was captured up to the point at which the image selected prior to the user's last selection was captured (a weather change indicated by a piece of favorite weather change information). Then, when the reported date and time has arrived, it is also possible to report, to the user, a timing at which there occurs a weather change that is coincident with or close to the weather change when the captured image was captured. Thus, the user can also capture an image with an ambience similar to the ambience of the desired captured image selected prior to the user's last selection, by performing image-capturing at the reported timing at the reported position.

The following modification may be made to the present embodiment.

For example, when the user captures an image using the camera 1, weather change information from a point in time before the image was captured up to the point at which the image was captured may be added to captured image data acquired by capturing the image. In this case, the weather change information may be acquired from the weather-information providing server 3 through the communication unit 210 and the network 2 on the basis of an image-capturing date and time and an image-capturing position. Here, the image-capturing position is acquired by the position information acquisition unit 209.

Further, the information terminal according to the present embodiment is not limited to a camera, but it may be a device such as a mobile handset, a PHS (personal handyphone system), a PDA (personal data assistant), a Smartphone™, or a tablet, or it may be a device that does not have an image-capturing function.

The embodiments described above are just examples to facilitate understanding of the present invention, and the invention is not limited to these embodiments. Various modifications and alterations may be made hereto without departing from the spirit of the invention specified in the claims.

What is claimed is:

1. An information terminal comprising:
   a display unit that displays one or more captured images;
   an image-capturing information acquisition unit implemented on a microcomputer that acquires image-capturing information added to a captured image selected from among the one or more captured images displayed on the display unit;
   a position information acquisition unit that acquires position information using at least one of a GPS, a base station, and a user-specified position;
   a communication interface that acquires, from an external server via a network, environmental change information in the past, environmental change information at present, and environmental change information in the future on the basis of the image-capturing information and the position information;
   a comparison circuit that compares the environmental change information in the past with the environmental change information in the future; and
   a report circuit that reports an image-capturing opportunity on the basis of a result of the comparison performed by the comparison unit, wherein
   the comparison circuit compares the environmental change information in the past with the environmental change information in the future at long time intervals in a chronological order, and when the environmental change information in the past and the environmental change information in the future are coincident or close, the comparison circuit compares the environmental change information in the past with the environmental change information in the future at short time intervals in a chronological order in real time.

2. The information terminal according to claim 1, further comprising:
a manipulation member or touch panel that receives a user selection of a certain captured image from among the one or more captured images displayed on the display unit, wherein
each of the one or more captured images is a captured image stored in the information terminal or a captured image acquired from an external server via the network, and
the image-capturing information acquisition unit acquires captured information added to the certain captured image selected by the manipulation member or touch panel.

3. The information terminal according to claim 1, wherein the image-capturing information acquisition unit acquires information on an image-capturing date and time and an image-capturing position of the selected certain captured image as image-capturing information added to the certain captured image.

4. The information terminal according to claim 1, wherein the position information acquisition unit acquires position information on a current position of the information terminal or a specified position.

5. The information terminal according to claim 1, wherein the environmental change information includes weather information on at least one of a weather, a temperature, a precipitation, a humidity, a wind speed, and a wind direction.

6. An information terminal comprising:
a display unit that displays one or more captured images;
an image-capturing information acquisition unit implemented on a microcomputer that acquires image-capturing information added to a captured image selected from among the one or more captured images displayed on the display unit;
a position information acquisition unit that acquires position information using at least one of a GPS, a base station, and a user-specified position;
a communication interface that acquires, from an external server via a network, environmental change information in the past, environmental change information at present, and environmental change information in the future on the basis of the image-capturing information and the position information;
a comparison circuit that compares the environmental change information in the past with the environmental change information in the future; and
a report circuit that reports an image-capturing opportunity on the basis of a result of the comparison performed by the comparison unit, wherein
the communication interface changes, according to an environmental change interval in the acquired environmental change information in the past, a time interval of time-series environmental information acquired as the environmental change information in the future.

7. A method for providing an image-capturing opportunity, the method being performed by an information terminal, the method comprising:
displaying one or more captured images;
acquiring image-capturing information added to a captured image selected from among the displayed one or more captured images;
acquiring position information;
acquiring, from an external server via a network, environmental change information in the past, environmental change information at present, and environmental change information in the future on the basis of the image-capturing information and the position information;
comparing the environmental change information in the past with the environmental change information in the future; and
reporting an image-capturing opportunity on the basis of a result of the comparison,
wherein the comparing the environmental change information in the past with the environmental change information in the future includes (1) comparing the environmental change information in the past with the environmental change information in the future at long time intervals in a chronological order, and (2) comparing, when the environmental change information in the past and the environmental change information in the future are coincident or close, the environmental change information in the past with the environmental change information in the future at short time intervals in a chronological order in real time.

8. A method for providing an image-capturing opportunity, the method being performed by an information terminal, the method comprising:
displaying one or more captured images;
acquiring image-capturing information added to a captured image selected from among the displayed one or more captured images;
acquiring position information;
acquiring, from an external server via a network, environmental change information in the past and environmental change information in the future on the basis of the image-capturing information and the position information;
comparing the environmental change information in the past with the environmental change information in the future; and
reporting an image-capturing opportunity on the basis of a result of comprising the environmental change information in the past with the environmental change information in the future, wherein
the acquiring the environmental change information in the past and the environmental change information in the future from the external server via the network includes changing, according to an environmental change interval in the acquired environmental change information in the past, a time interval of time-series environmental information acquired as the environmental change information in the future.

* * * * *